Oct. 4, 1966  B. F. GRIFFIN  3,276,157
AUTOMOBILE FLOOR MAT
Filed July 19, 1965
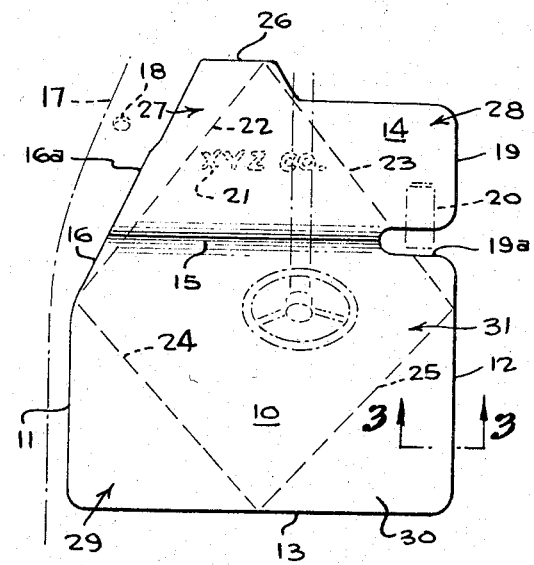
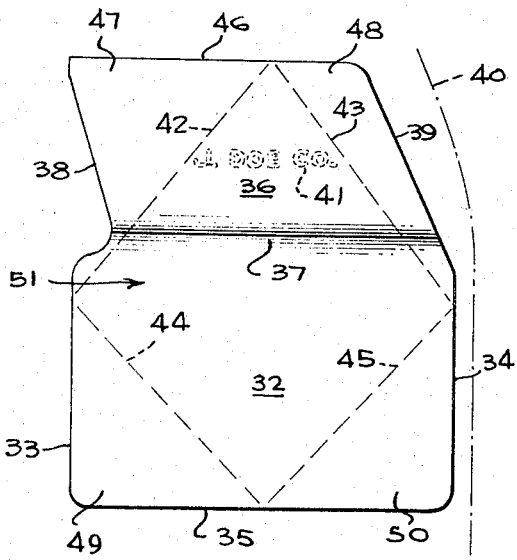
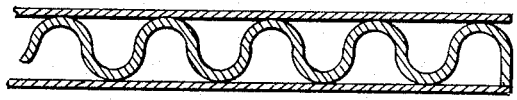
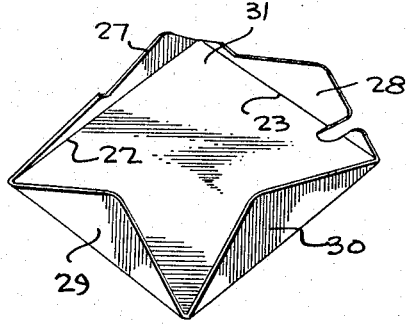
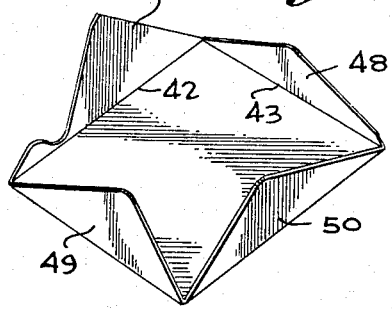
INVENTOR
BOBBY F. GRIFFIN
BY Mason, Fenwick & Lawrence
ATTORNEYS

United States Patent Office 3,276,157
Patented Oct. 4, 1966

3,276,157
AUTOMOBILE FLOOR MAT
Bobby F. Griffin, 1209 Norway St., Bristol, Va.
Filed July 19, 1965, Ser. No. 472,973
2 Claims. (Cl. 40—129)

This invention relates to disposable floor mats suitable for use in automobiles, and more particularly to disposable floor mats having selected indicia imprinted thereon for advertising purposes.

In the automobile accessory art, there are various types of automobile floor mats made of various materials such as rubber, plastics and the like which generally are employed to prevent wear of the normal carpeting or other floor covering. Such floor mats usually are intended for prolonged use and are considerably expensive depending upon the particular material from which they are made. In view of the widespread usage of such floor mats among automobile owners it has been found that disposable types of such floor mats having advertising indicia imprinted thereon can be inexpensively manufactured and distributed free to automobile owners, which provides an effective advertising medium.

In the manufacture of such disposable type mats it is desirable to produce mats which are inexpensive and which have substantially universal application considering the numerous different makes of automobiles. In addition, it is desirable to provide mats which are easy to install. Normally, the small door opening, the front seat structure, the instrument panel and the steering wheel of the automobile, provide restricted access to the front floor areas of the automobile. Most floor mats in the prior art of the rigid one piece type of construction are difficult to manipulate through the restricted opening and install in position on the floor areas.

Accordingly, it is the general object of this invention to provide a disposable floor mat suitable for use in automobiles.

Another object of this invention is to provide a disposable floor mat suitable for use in automobiles having suitable indicia imprinted thereon for advertising purposes.

A further object of this invention is to provide a disposable floor mat suitable for use in automobiles made of paper material having suitable indicia imprinted thereon for advertising purposes.

A still further object of this invention is to provide a disposable floor mat made of paper material having advertising information imprinted thereon which is adapted to fit most conventional makes of automobiles and which can be cut easily so that it can be made to fit any make of automobile.

Another object of this invention is to provide a disposable floor mat for automobiles which can be used in automobiles during demonstrations and repair thereof which will protect the regular floor carpeting or other covering from becoming soiled or damaged.

A further object of this invention is to provide a disposable floor mat for automobiles which is easy to install on the front floor area of an automobile.

A still further object of the invention is to provide a disposable floor mat for automobiles which is adapted to be readily manipulated to facilitate insertion of the same through the restricted opening provided in the automobile, and position it on the front floor area of the automobile.

Another object of this invention is to provide a disposable floor mat for automobiles of a one-piece, substantially rigid construction which is adapted to be readily manipulated to facilitate insertion and positioning in an automobile.

Further objects and advantages of the present invention will become apparent as the following description proceeds, when taken in conjunction with the drawings which accompany and form a part of this specification, wherein:

FIGURE 1 is a first embodiment of the invention which is adapted for use on the driver's side of the front floor area of an automobile;

FIGURE 2 is a second embodiment of the invention which is adapted for use on the passenger's side of the front floor area of an automobile;

FIGURE 3 is a cross-sectional view taken along line 3—3 in FIGURE 1;

FIGURE 4 is a perspective view of the first embodiment of the invention, illustrating the same disposed in position for installation in an automobile; and FIGURE 5 is a perspective view of the second embodiment of the invention, illustrating the same disposed in a position for installation.

The present invention generally is concerned with a floor mat for the front floor area of an automobile made of a disposable paper material, preferably cardboard, comprising a substantially rectangular shaped main panel having side edges and a lower edge, and an integral extension panel formed in continuation of the upper portion thereof which is adapted to be bent upwardly to conform with the inclined portion of the front floor area of an automobile. The panels are provided with fold lines extending diagonally from the upper edge of the extension panel to the side edges of the main panel and from the side edges of the main panel to the lower edge thereof. Imprinted on the mat are selected indicia suitable for advertising purposes.

Referring to FIGURE 1, there is shown a first embodiment of the invention which is adapted for use on the driver's side of the front floor area comprising a substantially rectangular shaped main panel 10 having a pair of parallel side edges 11 and 12, a rear free edge 13 and an integral irregular forward panel 14 formed in continuation of the panel 10 and adapted to be bent upwardly at an angle to the plane of panel 10 along one or more of parallel fold lines 15 which are parallel to rear edge 13 of panel 10. The outer edge 16a of the irregular panel is sloped inwardly in continuation of inwardly sloped edge 16 of the main panel to accommodate both the inwardly projecting wall portion 17 of the automobile and the light switch 18. The opposite side edge 19 of the irregular panel is provided with a suitable cut-out or recess 16a adjacent the junction line of the panels for accommodating the gas pedal 20. Imprinted on either the main panel or on the irregular panel, as illustrated in FIGURE 1, are suitable indicia 21 which are intended for advertisement.

The front face of the mat is provided with additional fold or score lines 22, 23, 24 and 25. Fold lines 22 and 23 extend diagonally from a common point on the upper free edge 26 of the extension panel, downwardly to the side edges 11 and 12 of the main panel. Fold lines 24 and 25 extend diagonally from the lower terminal ends of fold lines 22 and 23 on side edges 11 and 12, downwardly to a common point on the lower edge 13 on the main panel. The fold lines 22, 23, 24 and 25 substantially form a diamond configuration, providing flaps 27, 28, 29 and 30. The flaps are adapted to be folded upwardly relative to the diamond shaped portion of the mat 31 defined by the fold lines 22, 23, 24 and 25.

The embodiment shown in FIGURE 2 is adapted for use on the passenger's side of the front floor area of an automobile and comprises a substantially rectangular shaped main panel 32 having a pair of parallel side edges 33 and 34, a lower free edge 35 and an integral, substantially parallelogram shaped forward panel 36 formed in continuation of the main panel 32 and adapted to be bent upwardly along one or more of a plurality of parallel fold lines 37 which are parallel to the lower free edge 35 of the panel 32 to conform with the inclined portions of the front floor area of the automobile. The side edges 38 and 39 of the forward panel are sloped inwardly a sufficient amount so that the outer edge 39 will not interfere with the inwardly extending portion 40 of the automobile. Similar to the embodiment of FIGURE 1, selected advertising indicia 41 are imprinted on either the main panel 32 or the extension panel 36.

The front face of the mat is provided with a plurality of additional fold or score lines 42, 43, 44 and 45. Fold lines 42 and 43 extend diagonally from a common point on the upper free edge 46 of the extension panel, downwardly to the side edges 33 and 34 of the main panel. Fold lines 44 and 45 extend diagonally from the lower terminal ends of fold lines 42 and 43 on side edges 33 and 34, to a common point on the lower edge 35 on the main panel. The fold lines 42, 43, 44 and 45 substantially form a diamond configuration, providing flaps 47, 48, 49 and 50. These flaps are adapted to be folded upwardly relative to the diamond shaped portion of the mat 51, defined by the fold lines 42, 43, 44 and 45.

It will be appreciated that a sufficient number of fold lines 15 and 37 in the embodiments shown in FIGURES 1 and 2, respectively, are provided so that the disposable mats can be adapted to conform to the inclined portions of different makes and models of automobiles. Also, in the embodiment shown in FIGURE 1 the width of the recess 19a for the gas pedal is sufficiently enlarged to further accommodate the gas pedals which may vary in position in different makes of automobiles. Although the particular configuration of the mats shown in the drawing would be suitable for use in most conventional automobiles it would be possible to cut the mats to fit any make of automobile. It is contemplated that the mats be constructed from any suitable paper material, preferably of cardboard.

To install the above described embodiments of the invention in an automobile, the flap portions thereof simply are folded upwardly along the diagonal fold lines to condense the mats into more manageable units. The mats then are inserted through the restricted access openings of the automobile and positioned on the appropriate front floor areas. The flaps are folded down and the extension panels are bent upwardly to conform to the inclined portion of the floor. The mats finally are adjusted in their final resting positions. It will be appreciated that in condensing the mat by folding the flaps upwardly, the mats can easily be manipulated through the door opening and between the front seat, instrument panel and steering wheel of the automobile.

Accordingly, it will further be appreciated that the present invention provides an inexpensive and useful disposable floor mat for automobiles having selected advertising indicia imprinted thereon which can be distributed without cost by commercial enterprises for advertising various goods and services.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A disposable floor mat for automobiles comprising a substantially rectangular shaped main panel having an integral extension panel with an upper edge formed in continuation of the upper portion thereof, said mat having a plurality of parallel fold lines disposed to either side of the junction of said panels to permit said extension panel to be bent upwardly at an angle relative to the plane of said main panel, a side edge of said mat having a recess disposed adjacent the junction of said panels to accommodate a gas pedal of the automobile, a portion of the side of said mat opposite said first mentioned side thereof sloping inwardly, the mat having selected indicia imprinted thereof, said panels having fold lines extending diagonally from the upper edge of said extension panel to the side edges of said main panel and from the side edges of said main panel to the lower edge thereof and said diagonal fold lines forming a substantially diamond shaped figure having the apices thereof terminating at the upper, side and lower edges thereof whereby said mat may be folded upwardly along said diagonal fold lines to facilitate installation and removal thereof in an automobile, and to form a recepticle when the mat is removed from an automobile, thus preventing spillage of accumulated matter thereon.

2. A disposable floor mat for automobiles comprising a substantially rectangular shaped main panel having side edges and a lower edge, and an integral extension panel with an upper edge formed in continuation of the upper portion thereof, said extension panel having substantially a parallelogram shape, said mat having a plurality of parallel fold lines disposed to either side of the junction of said panels to permit said extension panel to be bent upwardly at an angle relative to the plane of said main panel, said mat having selected indicia imprinted thereon, said panels having fold lines extending diagonally from the upper edge of said extension panel to the side edges of said main panel and from the side edges of said main panel to the lower edge thereof and said diagonal fold lines forming a substantially diamond shaped figure having the apices thereof terminating at the upper, side and lower edges thereof whereby said mat may be folded upwardly along said diagonal fold lines to facilitate installation and removal thereof in an automobile and to form a receptacle when the mat is removed from an automobile, thus preventing spillage of accumulated matter thereon.

References Cited by the Examiner

UNITED STATES PATENTS 2,505,554  4/1950  Kravitz _____ 161—109
2,793,149  5/1957  Richter _____ 40—129 X EUGENE R. CAPOZIO, *Primary Examiner.*

S. M. BENDER, *Assistant Examiner.*